Sept. 9, 1958

R. R. PROCTOR 2,850,901

DIFFERENTIAL PRESSURE INDICATOR

Filed Dec. 28, 1953

INVENTOR.
RONALD R. PROCTOR

BY

*Edward W. Tang*

ATTORNEY.

United States Patent Office 2,850,901
Patented Sept. 9, 1958

2,850,901

DIFFERENTIAL PRESSURE INDICATOR

Ronald R. Proctor, Crystal Lake, Ill., assignor to The Pure Oil Company, Chicago, Ill., a corporation of Ohio Application December 28, 1953, Serial No. 400,683

4 Claims. (Cl. 73—412)

This invention relates to a mechanical pressure gauge and is particularly directed to pressure gauges which permit two separate but related pressures to be read on the same dial.

In the majority of unit operations employed in chemical processing and manufacturing industries, instrumentation is an essential element in their control. Although in industrial processes, temperature is the most frequently measured operating variable, pressure is the next most important operating variable whose effect is translated into visible manifestations to facilitate its control. Pressure may be gauged by a variety of instruments. However, because Bourdon tube pressure gauges are moderately priced, and yet accurate, reliable, and adaptable for all general requirements under most conditions of service, this type of pressure gauge is the most important instrument used in the industry for pressure measurement. While most common type pressure gauges actually show a difference between two pressures, one pressure being atmospheric, the other being the pressure exerted by a fluid within a vessel or conduit forming a part of an industrial process, they are not usually referred to as differential pressure gauges. Differential pressure gauges are those which indicate the difference between two pressures, both distinguished from that of the atmosphere. Differential pressure gauges find a number of industrial applications in installations such as air brake systems, filter systems, flowmeters, etc., where it is desirable to read the difference in pressures from two separate sources. While there are a number of manometer type, sealed bulb type, and diaphragm type which show the net pressure differential, there are also Bourdon tube pressure gauges available for differential pressure applications. One type which is the so-called duplex pressure gauge simply consists of two gauges having a common dial installed for convenience in one case. In this type of gauge, although the pressures are indicated on one dial, the respective pressures are indicated by separate pointers. Therefore, in order to determine the differential pressure, it is necessary to indulge in a mathematical computation which is frequently a mental calculation. This need for computation results in frequent errors which are not in harmony with the function of a pressure gauge as a process control instrument.

It is, therefore, the primary object of this invention to provide a Bourdon tube differential pressure gauge which will indicate the net difference between two separate pressures on the same dial by employing only a single pointer. These and other objects of this invention will be more readily understood from the following explanation of this invention:

Figure 1:
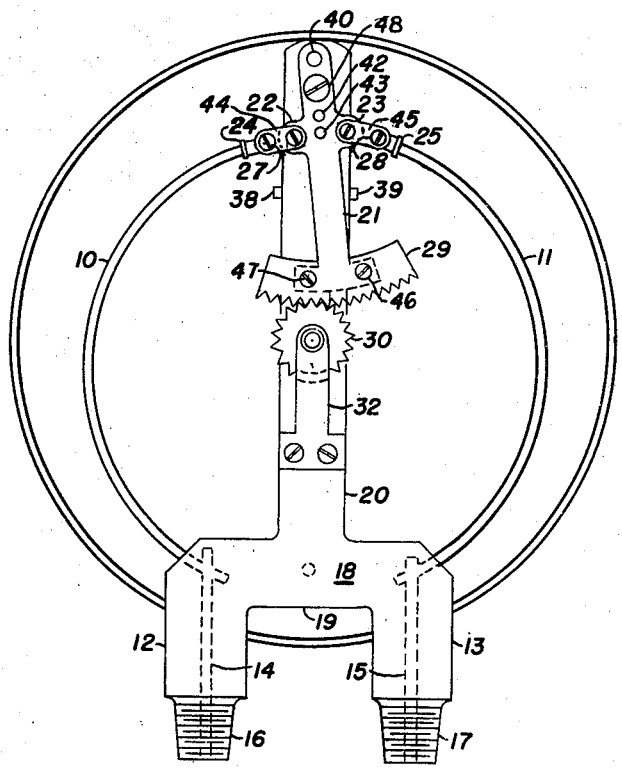
Figure 1 is a front elevation view showing the internal movement mechanism without the transparent closure, dial and indicator being in place.
Figure 2:
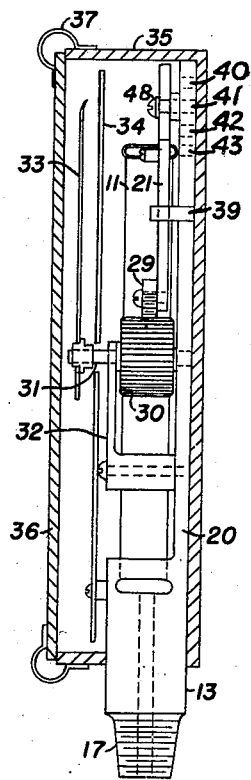
Figure 2 is a side elevation of the differential pressure gauge without one of the Bourdon tubes in position on the gauge socket and showing a fragmentary cross-sectional view of the case.
Figure 3:
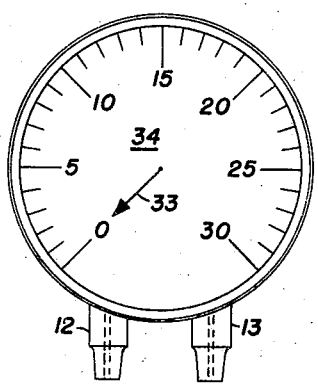
Figure 3 is a front elevation of the completely assembled differential pressure gauge showing one arrangement of dial and pointer which may be employed in the invention.

By referring to the attached drawing it will be seen that the Bourdon tube differential pressure gauge of this invention comprises a pair of matched Bourdon tubes 10 and 11, each having an arc of about 180°. These tubes are mounted in separate gauge sockets 12 and 13. Depending upon the application of the gauge, the Bourdon tubes may be threaded and screwed into the sockets or connected by welding or soldering. The gauge sockets 12 and 13, which are provided with separate passageways 14 and 15 interconnecting the pipe connections 16 and 17 with the tubes 10 and 11, are formed into an integral unitized gauge socket body 18 by means of the web or cross-piece 19. As shown, the gauge socket is fitted with "bottom" type pressure connections 16 and 17. If preferred, the connections may be located in the back of the socket body. The movement mechanism of the gauge comprises a mechanism support 20 which extends laterally from the gauge socket body 18. This support may be in any convenient form and may be made as a part of the gauge socket body or by means of a separate plate which is then affixed by any suitable fastening means to the gauge socket body. Pivotally mounted adjacent to the terminal extremity of the support 20 by means of pivot 48 is a sector link 21. Opposed mounting lugs 22 and 23 are provided on the sector link 21. These lugs 22 and 23 are pivotally connected links 44 and 45 and to these are linked the tips 24 and 25 of tubes 10 and 11 by means of connecting link screws 27 and 28 or other suitable fasteners which provide opposed flexible connections between the tips 24 and 25 of the Bourdon tubes 10 and 11 and the sector link 21. Affixed to one end of the sector link 21 is a circularly arcuate sector gear 29 which intermeshes with pointer pinion 30. The axle 31 of pointer pinion 30 is journaled in suitable bearing holes provided in the mechanism support 20 and bearing bracket 32. These holes, if desired, may be bushed with a suitable bearing material such as bronze, stainless steel, nylon, or other suitable bearing materials. Attached to that portion of the pinion axle extending through the bearing bracket is a suitable indicator pointer 33 which co-registers with a suitably calibrated dial 34 interposed between pointer 33 and bearing bracket 32. Although the dial may be affixed to the gauge in any convenient manner, it is preferred that it be mounted on the gauge socket body 18 independent of case 35. If this expedient is employed, the socket, movement mechanism, dial, and pointer form one integral unit and the entire unit may be removed from the case for servicing. To avoid the accumulation of dust and dirt in the mechanism, the case 35 is enclosed by means of a transparent closure 36 which is held in position by means of a ring 37 which engages with the closure 36 and case 35. The ring may be designed to simply slip on the case and be held in place by friction or, may be a threaded ring or a ring hinged to the case. The closure may be plain or shatter-proof glass or disc of transparent plastic may be employed instead of the glass crystals. Although not shown, a helical hair spring may be attached to the pointer pinion axle 31 and also affixed to the mechanism support 20 to eliminate any backlash that may occur between pointer pinion 30 and the sector gear 29. It is also preferred in order to avoid damage to the gauge, if either tube is subjected alone to full line pressure, to provide stops 38 and 39, which will prevent the movement of the mechanism beyond a desired point. If desired, the indicating range of the gauge can be changed by using different pivot holes 40, 42 and 43 positioned adjacent to the terminal end of sector link 21. This change in pivot point is occasioned when the gauge is put in a service measuring pressure differentials outside the range permitted by a particular location of sector link pivot point. To effect this change the pivot 48, positioned in movement support 20 and coregistering with pivot 41 of sector link hole 21, is removed from the pivot hole when the sector link is in a neutral position with no pressure applied to the Bourdon tubes. The pivot is repositioned in either pivot holes 40, 42 or 43, as desired, when the sector link is in the aforesaid neutral position. In the event that the pivot of sector link 21 is changed, it will be necessary to also change the gear sector 29 to one of corresponding proper radius. This is made possible by changing the removably affixed sector 29 which is attached to the sector link 21 by means of sector screws 46 and 47, and substituting a sector gear having the proper radius.

It is seen from the foregoing description that the differential pressure gauge of this invention comprises two matched Bourdon tubes which are linked to one another in such a manner as to act in opposition to each other thereby translating the interactions of the tubes into manifestations of differential pressure. With equal pressure in both tubes, there is an equal pull in each direction on the sector link 21 connected to the tips of the Bourdon tubes, and the pointer which is linked thereto will remain immovable at zero. However, with the pressure in one tube greater than that in the other, the link connecting the ends of the tube will be pulled in the direction of the tube with the highest pressure and will appropriately actuate the pointer by means of movement mechanism of the gauge.

The materials of construction used in the gauge of this invention are those conventionally employed in gauges of this nature. A number of different metals and alloys can be used to fabricate the Bourdon tubes, e. g. phospor bronze, alloy steels, stainless steels, and beryllium copper. The dial may be graduated in various ranges of convenient units depending upon the type of service in which the gauge is used. Furthermore, cases suitable for either flush mounting and direct mounting may be employed to enclose the gauge. Nothing in the construction of this invention prevents the use of gauge savers, needle valves, or pulsation dampeners for pressure pulsation. This invention may also be used in manufacturing gauges utilized in various services where the pressure medium being measured is water, steam, oil, gas, ammonia, etc. It is to be understood that the apparatus described herein is only an illustrative and non-limiting example of this invention and that additional modifications other than those noted above can be made in design without departing from the purview of this invention.

What is claimed is:

1. A Bourdon tube differential pressure gauge which comprises a gauge socket body having separate pressure inlets, a pair of opposed matched Bourdon tubes having an arc of not greater than 180° mounted in said body, each of said tubes having a tip integrally affixed to its free terminal extremity and being connected to a pressure inlet, a rotary geared movement comprising a pointer pinion shaft, a pointer pinion integrally attached to said shaft, a rotatable, removable sector gear intermeshing with said pinion and a pivoted linkage member having means for varying the length of said member between the linkage member pivot and the pointer pinion shaft, connecting said sector gear with the tips of said Bourdon tubes whereby the angular deflection of said tubes is translated into a rotary motion by means of said rotary geared movement.

2. An apparatus in accordance with claim 1 in which said linkage member is pivotally mounted adjacent its terminal extremity, the linkage member is provided with a plurality of spaced pivot points as the means for varying its length between the linkage member pivot and the pinion shaft, and the tips of the Bourdon tubes are connected to said sector gear by means of a pair of opposed lugs extending laterally from said linkage member, each lug being linked to the tip adjacent thereto.

3. A Bourdon tube deflection pressure gauge comprising a case, a gauge socket body having a pair of separate pressure inlets, a pair of opposed matched Bourdon tubes having an arc of not greater than 180° mounted in said body, each of said tubes having a tip integrally affixed to its free terminal extremity and being connected to a pressure inlet, a rotary geared movement integrally mounted on said socket body said rotary geared movement comprising a pointer pinion shaft, a pointer pinion integrally attached to said shaft, a rotatable removable sector gear intermeshing with said pinion, a linkage connecting said sector gear with the tips of said Bourdon tubes, said linkage comprising a linkage member attached to said removable sector gear and rotatably attached adjacent its terminal extremity to a pivotal mounting, and a pair of opposed mounting lugs laterally extended from said linkage member and disposed intermediate the sector gear and the pivotal mounting, each of said lugs being linked to the tip of the Bourdon tube adjacent thereto, said sector gear being removably attached to said linkage member and said linkage member being provided with a plurality of pivot points for varying the length of said linkage member between said linkage pivot point and said pointer pinion shaft.

4. A Bourdon tube, differential pressure gauge which comprises a gauge socket body having a pair of pressure inlets, a pair of opposed, matched Bourdon tubes, mounted on said socket body each tube having a tip integrally affixed to its free terminal extremity and being connected to a pressure inlet, a rotatable pointer mounted on a shaft, an adjustable, pivoted linkage member operatively connected to the tips of said Bourdon tube whereby said linkage member is caused to oscillate by the angular deflection of said tubes effected by the application of pressure to said tubes, and interchangeable means operatively connecting said pivoted linkage member to said pointer whereby the angular deflection of said tubes is translated into a rotary motion to effect the rotation of said pointer, said means including a first rotatable member mounted on said pointer shaft and a second member removably attached to said linkage, said second member engaging said first member, and said linkage member being provided with a plurality of pivot points for varying the length of said linkage member between the linkage pivot point and said pointer shaft.

References Cited in the file of this patent

UNITED STATES PATENTS

| | | |
|---|---|---|
| 900,371 | Hopkins | Oct. 6, 1908 |
| 1,165,225 | Carrier | Dec. 21, 1915 |
| 1,406,616 | Cutts et al. | Feb. 14, 1922 |
| 1,414,154 | Place | Apr. 25, 1922 |

FOREIGN PATENTS

| | | |
|---|---|---|
| 547,519 | France | Sept. 25, 1922 |

UNITED STATES PATENT OFFICE
CERTIFICATE OF CORRECTION

Patent No. 2,850,901                                             September 9, 1958

Ronald R. Proctor

It is hereby certified that error appears in the printed specification of the above numbered patent requiring correction and that the said Letters Patent should read as corrected below.

Column 2, line 31, for "These lugs" read -- To these lugs --; column 3, line 8, for "pivot 41" read -- pivot hole 41 --; line 9, strike out "hole", first occurrence.

Signed and sealed this 16th day of December 1958.

(SEAL)
Attest:

KARL H. AXLINE                                                  ROBERT C. WATSON
Attesting Officer                                            Commissioner of Patents